United States Patent Office 3,037,962
Patented June 5, 1962

---

3,037,962
ORGANOSILOXANES
Homer A. Hartung, Grand Island, and Robert C. Borchert, West Seneca, N.Y., assignors to Union Carbide Corporation, a corporation of New York
No Drawing. Filed May 28, 1959, Ser. No. 816,378
9 Claims. (Cl. 260—46.5)

This invention relates in general to novel vinyl-containing organosiloxanes and to a process for their production. More particularly, this invention is concerned with novel organosiloxanes wherein vinyl groups are bonded to alternate silicon atoms and to a process for their production.

It is known that siloxanes which contain silicon-bonded monovalent hydrocarbon radicals are prepared by the hydrolysis and condensation of a silane containing hydrolyzable groups. Siloxanes composed of units containing different silicon-bonded monovalent hydrocarbon radicals can be prepared by the cohydrolysis and co-condensation of the corresponding hydrolyzable silanes. Siloxanes composed of units containing different silicon-bonded monovalent hydrocarbon radicals have also been prepared by acidic or basic equilibration of cyclosiloxanes. The siloxanes prepared by the above methods consist of units which are distributed in the siloxane polymer in a random manner. The structures of the siloxane polymers are thus left largely to chance and are unpredictable.

It is also known that siloxanes can be produced by reacting diphenylsilane diol with dialkyldichlorosilanes with the liberation of hydrogen chloride. This method produces siloxanes which contain some alternating units in the chain; however, the hydrogen chloride that is liberated causes undesirable side reactions and the final result is a siloxane polymer which does not have a reproducible structure.

We have found that organosiloxanes of a controlled structure can be produced by the reaction of diphenylsilane diol with a vinyl (hydrocarbon) dichlorosilane in the presence of a tertiary amine as a hydrogen chloride acceptor.

In accordance with the practice of our invention, a vinyl (hydrocarbon) dichlorosilane having the formula:

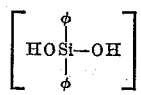

(1)

where R is a monovalent hydrocarbon radical free of aliphatic unsaturation is reacted with diphenylsilane diol in the presence of a tertiary amine to yield an organosiloxane having a structure consisting of alternating units of the formulas:

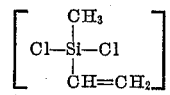

(2)

and

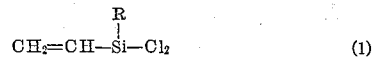

(3)

i.e., organosiloxanes of the structure:

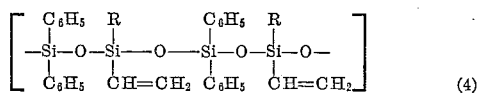

(4)

where R has the above-defined meaning. The organosiloxanes of this invention include the cyclic tetramers having alternating units of (2) and (3) and linear organosiloxanes having these alternating units.

The manner in which the compositions of this invention are produced is more readily shown by use of the following equations, which show, for the purposes of illustration, the reaction between diphenylsilane diol $$\left[ \begin{array}{c} \phi \\ HO-Si-OH \\ \phi \end{array} \right]$$

and methylvinyldichlorosilane $$\left[ \begin{array}{c} CH_3 \\ Cl-Si-Cl \\ CH=CH_2 \end{array} \right]$$

in the presence of triethyl amine:

(I)

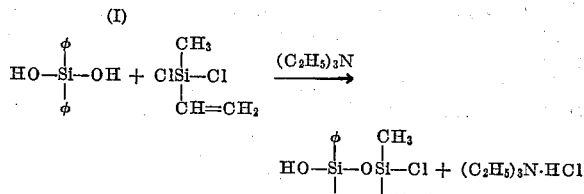

(II)

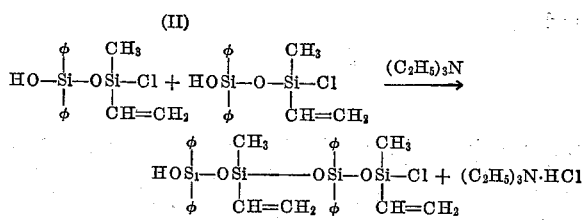

and so on. In the reaction product as shown by Equation II, the chlorine group of the siloxane reacts with the terminal hydroxy group of the same unit to give rise to the cyclic tetramer. Of course, the terminal chlorine atom of one molecule can also react with the terminal hydroxyl group of a second molecule to produce linear organosiloxanes having a controlled structure.

Since diphenylsilane diol is a solid crystalline material, it is preferred to conduct the reaction in the presence of a liquid organic compound in which diphenylsilane diol and the vinyl hydrocarbon dihalosilane are soluble and which is non-reactive therewith. Such solvents should also be nonreactive with the products. Such liquid organic compounds are, for example, the dialkyl ethers and the like; the dialkyl ethers of ethylene glycol and the like; dioxane, tetrahydrofuran and the like; ketones such as acetone and the like.

The reaction is conducted in the presence of a tertiary amine. The tertiary amine serves as a hydrogen chloride acceptor and greatly accelerates the desired reaction, while preventing the hydrogen chloride formed in the reaction from causing undesirable side reactions. By the term tertiary amine, as used herein, is meant the aliphatic tertiary amines such as triethyl amine, tri-n-butyl amine and the like; and the heterocyclic amines having a tertiary amino nitrogen such as pyridine, quinoline and the like.

Diphenylsilane diol and the hydrocarbon vinyldichlorosilanes react at a reasonable rate at room temperature in the presence of a tertiary amine and the use of heat to increase the rate of reaction is not necessary. Although the reaction can be caused to take place at higher or lower temperatures, no commensurate advantage is obtained thereby. We prefer to operate at temperatures in the range of from about 20 to about 40° C. At temperatures above 60° C. under similar conditions, the condensation of diphenylsilane diol with itself rather than with the chlorosilane becomes a significantly undesirable side reaction.

We have found that organosiloxanes consisting of alternating units of formulas

where R is defined as above and

have unexpected properties when further polymerized to crosslinked resins by a vinyl-polymerization catalyst. The crosslinked resins thus obtained have unexpectedly high tensile strengths and elongations. The tensile strengths of the crosslinked resins are in the order of about one and a half to three times the tensile strength and the elongations are about twice the elongations obtained from vinyl-containing siloxanes prepared by the methods of the prior art and polymerized with a vinyl-polymerization catalyst.

The compositions of the instant invention are organosiloxanes consisting of alternating units of the formulas:

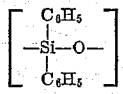

and

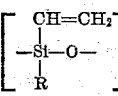

where R is as above defined. The monovalent hydrocarbon radicals that R may represent are, for example, alkyl groups such as methyl, ethyl, propyl, butyl and the like; aryl groups such as phenyl, tolyl and the like; and aralkyl groups such as benzyl, phenylethyl and the like.

The organosiloxanes of this invention include cyclic organosiloxanes having the formula:

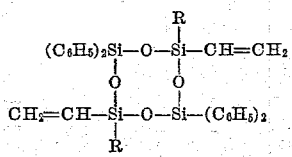

wherein R is as above defined. These cyclic organosiloxanes include both the cis and trans isomers.

The compositions of this invention also include linear organosiloxanes having repeating units of the formula:

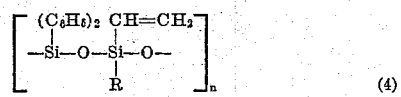

where R is as above defined, and $n$ is a whole number. Illustrative of such organosiloxanes are diphenylsiloxymethylvinylsiloxanes, i.e., organosiloxanes containing repeating units of Formula 4 where R is methyl; diphenylsiloxyethylvinylsiloxane (i.e., organosiloxanes of Formula 4 where R is ethyl); diphenylsiloxyphenylvinylsiloxane (i.e. organosiloxanes of Formula 4 where R is a phenyl group) and the like.

In employing the organosiloxanes of this invention for the production of crosslinked resins by polymerization by means of a vinyl polymerization catalyst, it is not critical whether the cis or trans isomer be employed. A mixture of such isomers can also be employed.

The organosiloxanes of this invention are usually solid materials at room temperature. In this form, they can be safely transported without the need for solvent. Upon simple heating to a temperature of about 85° C., they become fluid and can be poured into any desirable shape. After the organosiloxane has become fluid, a vinyl-polymerization catalyst is admixed therewith prior to casting and curing.

We can employ organic peroxides as the vinyl-polymerization catalysts. Typical of such peroxides are dicumyl peroxide and di-t-butyl peroxide. While the curing temperature is dependent upon the decomposition temperature of the peroxide employed, we find that curing will take place over the range of from 110° to 160° C. when dicumyl peroxide or ditertiary butyl peroxide is used as the catalyst.

By the term "curing" as used herein is meant the formation of a solid non-fusible resinous material by means of crosslinks formed by the polymerization of the silicon-bonded vinyl groups.

While the compositions of this invention can be employed per se with a vinyl-polymerization catalyst to produce resins having superior elongation and tensile strengths, we have also found that the compositions of this invention can be admixed with other vinyl-containing linear siloxane fluids prepared by prior art methods and cured to resins by means of an organic peroxide to yield resins having physical properties superior to those obtained from the polymerization of vinyl-containing linear siloxane fluids of the prior art alone with a vinyl-polymerization catalyst. The vinyl-containing linear siloxane fluids that can be thus admixed are, for example, linear siloxane fluids containing from about 8% to about 35% by weight methylvinylsiloxane units. The remaining siloxane units in the linear polysiloxane can comprise dimethyl-, diphenyl-, vinylphenyl- and methylphenylsiloxane units. To obtain the best physical properties, it is preferred that the organosiloxanes of this invention be employed in the admixture in amounts from about 50 to 99.9 parts by weight of the organosiloxanes of this invention to from about 50 to 0.1 part by weight of the vinyl-containing linear siloxane fluids prepared by prior art methods.

The vinyl-containing linear siloxane fluids employed in admixtures with the organosiloxanes of this invention and a vinyl-polymerization catalyst to produce resins having excellent physical properties can be prepared according to known techniques. Thus, for example, the vinyl-containing linear siloxane fluids are prepared by acid or basic equilibration of cyclic siloxanes. The linear fluids may also be prepared by the cohydrolysis and cocondensation of vinyl-containing hydrolyzable silanes (e.g. vinylmethyldichlorosilane) and hydrocarbon hydrolyzable silane (e.g. dimethyldichlorosilane) according to heretofore known methods.

The diphenylsilane diol starting material employed in the production of the organosiloxanes of this invention is a known material and can be prepared by known methods. The vinyl(hydrocarbon)dichlorosilanes employed as starting materials in the production of the organosiloxanes of the invention are also known materials and can be prepared by known methods, e.g. the reaction of a hydrocarbon magnesium bromide with vinyltrichlorosilane.

The organosiloxanes of this invention are useful in the preparation of resins having superior physical properties. Thus, for example, the organosiloxanes of this invention can be admixed with an organic peroxide and used to encase transistors and the like.

The following examples serve to further illustrate the invention:

EXAMPLE 1

Diphenylsilane diol (648 g., 3.0 moles) was dissolved in 1.5 liters tetrahydrofuran. This was slightly more than the amount of tetrahydrofuran needed to completely dissolve the diphenylsilane diol. A five-liter, 3-neck flask equipped with a stirrer, reflux condenser and two addition funnels was charged with triethyl amine (628 g., 6.2 moles), and diethyl ether (1.5 lbs.), the diethyl ether being employed as a solvent. Into one of the addition funnels was placed the solution of diphenylsilane diol in tetrahydrofuran and the other addition funnel was charged with methylvinyldichlorosilane (430 g., 3.05 moles). The methylvinyldichlorosilane and the solution of diphenylsilane diol were added simultaneously in a dropwise manner, in approximately stoichiometric ratios to the mixture of triethyl amine and diethyl ether in the flask with rapid stirring. Heat was evolved and a voluminous precipitate of triethylamine hydrochloride was produced. The addition was completed in a three-hour period and the reaction mixture was stirred overnight. The reaction mixture was washed with water to give a water layer, to remove the water soluble triethylamine hydrochloride and an organic layer. The organic layer was separated and evaporated at atmospheric pressure and then at 0.4 mm. Hg pressure for one-half hour to remove the diethyl ether, tetrahydrofuran and any remaining triethylamine. At this point, 800 g. of a product was obtained. At room temperature this product was a slushy mass of crystals.

The product was distilled through a Distillation Products Industries' molecular still. The following fractions were obtained:

| Fract. | Temperature, °C. | Pressure | Weight, g. |
|---|---|---|---|
| I | 150–170 | 30–50 microns | 178 |
| II | 170–175 | 30 microns | 153 |
| III | 175–235 | 30–70 microns | 107 |
|  |  | Residue | 338 |

Fraction I was a yellowish crystalline material with a melting point of 67–73° C. It was recrystallized from benzene to give white crystals with a melting point of 81–83° C. Fraction II was similar to fraction I in appearance with a melting point of 74–78° C. and after recrystallization from benzene, it has a melting point of 82–84° C. Fraction III was a mixture of liquid and crystalline materials. Recrystallization from benzene gave crystals melting from 77 to 79° C. The non-distillable linear polymer was a dark amber liquid with a viscosity of 380 poise at 25° C.

Fraction II was identified as 2,2,6,6-tetraphenyl-4,8-dimethyl-4,8-divinylcyclotetrasiloxane

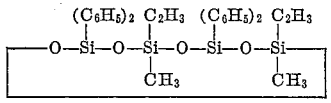

and gave the following analysis: Calculated—Molecular wt., 568; Br. No. 56. Found: Molecular wt. (Cryoscopic), 630±63; Br. No. 53.

EXAMPLE 2

All of the resins described below were cured and tested in the same manner. The general procedure for obtaining the resin was to catalyze the starting material with 1.5 parts by weight of dicumyl peroxide per 100 parts by weight of the starting material. To aid the mixing of the peroxide into the starting material, the starting material was usually warmed slightly to reduce the viscosity and in this manner good intimate mixing was easily obtained. The catalyzed starting material was cast into a suitable mold in order to obtain a molded slab approximately ⅛ inch thick. These molded slabs were then cured to a resin in a 150° C. oven, for four hours.

The cured resin was tested for hardness with a Barcol hardness tester, then a dumbell-shaped specimen was cut out for measurement of tensile strength and ultimate elongation according to the procedure described in ASTM specification D–638–58–T. The following results were obtained with the reaction products from the foregoing examples, and the subsequent preparations, both of which have the same overall compositions:

| Material | Barcol Hardness | Tensile, p.s.i. | Elongation, percent |
|---|---|---|---|
| Reaction Product From Example I | 78 | 3,270 | 5.0 |
| Reaction Product From Preparation I | 69 | 985 | 2.5 |

This data illustrates the profound effect of having a predominance of 4,8-dimethyl-4,8-divinyl - 2,2,6,6 - tetraphenylcyclotetrasiloxane, in a resin.

In another test, fraction II from the distillation in Example I was cured to a clear resin which also had a hardness of 78, a tensile strength of 3270 p.s.i., and an elongation of 5.0%. In order to reduce the brittleness, a plasticizer was added to the controlled structure product. For a plasticizer linear siloxane fluid made by prior art methods and containing 12.9 wt.-percent methylvinylsiloxane, 74.2 wt.-percent diphenylsiloxane and 12.9% dimethylsiloxane units was used. A mixture of 98% of fraction II of Example I and 2 wt.-percent of the linear siloxane fluid was cured to a resin using dicumyl peroxide. Its properties were:

Hardness _____ 78
Tensile _____p.s.i.__ 3770
Elongation _____percent__ 9.0

EXAMPLE 3

The preparation of Example I was repeated. This controlled structure product contained more than 55 wt.-percent 2,2,6,6 - tetraphenyl-4,8-dimethyl-4,8-divinylcyclotetrasiloxane, the remainder consisted of the alternating structure linear organosiloxanes. The controlled structure product was mixed in various proportions with a linear siloxane fluid and cured. This siloxane fluid was a linear siloxane fluid containing approximately 63.2% diphenylsiloxane, 20.8 wt.-percent methylvinylsiloxane, 13.6 wt.-percent dimethylsiloxane and 2.4 wt.-percent trimethylsiloxane end blocker. In the following table the ratios of parts by weight of the linear siloxane fluid to products of this example are listed with the physical properties of the cured resins:

| Ratio of Linear Siloxane Fluid to Organosiloxane | Barcol Hardness | Tensile, p.s.i. | Elongation, percent |
|---|---|---|---|
| 3:1 | 60 | 2360 | 11.0 |
| 1:1 | 69 | 3600 | 9.0 |
| 1:3 | 74 | 4620 | 7.5 |

This data shows that the controlled, alternating structure organosiloxanes of this invention yield unexpectedly high tensile strengths when incorporated into siloxane compositions prepared by prior art methods.

The following two preparations were made according to the heretofore known methods.

*Preparation I*

This preparation shows that the reaction of diphenyl silane diol with methylvinyldichlorosilane according to the process of this invention results in a different product than that prepared by the cohydrolysis of diphenyldichlorosilane and methylvinyldichlorosilane by heretofore known methods.

A 5-liter flask equipped with a stirrer, reflux condenser and an addition funnel was charged with triethyl amine (720 g., 7.1 moles), anhydrous diethyl ether (2 lbs.) methylvinyldichlorosilane (247 g., 175 moles) and diphenyldichlorosilane (444 g., 1.75 moles). A solution of water (3.5 moles) in tetrahydrofuran (750 ml.) was added dropwise with vigorous stirring. There was a vigorous reaction and a voluminous precipitate of triethyl amine hydrochloride. After completion of the hydrolysis, the reaction mixture was washed with water to remove triethyl amine hydrochloride and stripped of solvent by a technique similar to that used in Example 1. In the reaction mixture of Preparation I, some low boiling siloxanes (B.P. 140°/1 mm. to 156°/2 mm.) were observed. No siloxane boiling in this range was noted in Example 1. The total yield of siloxane obtained was 456 g. The product was a clear fluid with a viscosity of 17.8 poise at 25° C. This was in sharp contrast to the product from Example 1 which was a solid mass of crystals immediately upon cooling to room temperature. The difference was due to the fact that in the cohydrolysis reaction of this example a random mixture of cyclic trimers, tetramers, pentamers and probably even hexamers was obtained and each of these may exist in many possible isomers. In Example 1, the principal product was 2,2,6,6-tetraphenyl-4,8-dimethyl-4,8-divinyl-cyclotetrasiloxane and this crystallized readily from the higher molecular weight by-products in the reaction mixture.

*Preparation II*

Diphenylsilane diol (216 g., 1 mole) was mixed with methylvinyldichlorosilane (158 g.) which was 91% pure, the major impurity being toluene, so that the mixture contained one mole of methylvinyldichlorosilane. There was no apparent reaction at room temperature. HCl was evolved when the mixture was heated to reflux. After two hours with stirring 62. g. of HCl were lost and the crystalline diphenylsilane diol became completely compatible with the reaction mixture. Triethylamine (50 g.) was then added to complete the reaction. The siloxane was dissolved in ether and washed with water three times. The ethereal solution was stripped and sparged to give a clear liquid product. There was no apparent crystallization. The liquid product had a viscosity of 160 poise. A sample of the liquid was submitted for analysis for bromine number and hydroxyl. Bromine number was 40±3 and hydroxyl was 1.2±0.1% as compared to a theory of 56 and 0. When the liquid product was cured to a resin using dicumyl peroxide in the usual manner of Example 1, its tensile strength was 1000 p.s.i. less than the analogous tensile strength of a resin prepared from the good control structure organosiloxane prepared in Example 3.

The tensile strengths and elongations were measured according to the procedure described in ASTM specification D–638–58–T.

What is claimed is:

1. An organosiloxane selected from the class consisting of linear organosiloxanes and cyclic organosiloxanes consisting essentially of alternating units of the structure:

and

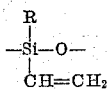

wherein R is a monovalent hydrocarbon radical free of aliphatic unsaturation.

2. An organosiloxane of the formula:

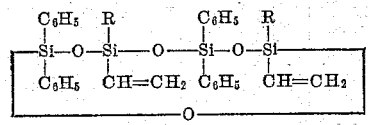

wherein R is a monovalent hydrocarbon radical free of aliphatic unsaturation.

3. 4,8 - Dimethyl-4,8-divinyl-2,2,6,6-tetraphenylcyclotetrasiloxane.

4. An organosiloxane consisting essentially of repeating units of the formula:

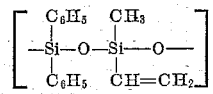

said organosiloxane being selected from the class consisting of a cyclic organosiloxane having two such units and linear organosiloxanes having a number of such units.

5. An organosiloxane consisting essentially of repeating units of the formula:

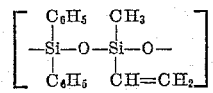

said organosiloxane consisting essentially of a cyclic tetramer having two such units and of linears having a number of such units.

6. A composition of matter consisting essentially of a cured crosslinked resin prepared by heating 2,2,6,6-tetraphenyl-4,8-dimethyl-4,8-divinylcyclotetrasiloxane with an organic peroxide vinyl polymerization catalyst to a temperature sufficiently elevated so as to cause crosslinking substantially through vinyl to vinyl groups.

7. As a new composition of matter, a cured cross-linked resin prepared by heating a composition comprising
(1) from 50 to 99.9 parts by weight 2,2,6,6-tetraphenyl-4,8-dimethyl-4,8-divinylcyclotetrasiloxane,
(2) from 50 to 0.1 parts by weight of a linear siloxane fluid containing from 8% to 35% by weight of methylvinylsiloxane units, the remaining siloxane units being selected from the class consisting of diphenyl, dimethyl, phenylvinyl, and methylphenylsiloxane units, and
(3) an organic peroxide vinyl polymerization catalyst, to a temperature sufficiently elevated so as to cause crosslinking substantially through vinyl to vinyl groups 8. A process for producing an organosiloxane selected from the class consisting of linear organosiloxanes and cyclic organsiloxanes, said organosiloxane consisting essentially of alternating units of the formulas:

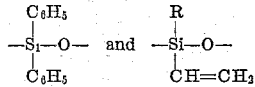

wherein R is a monovalent hydrocardon radical free of aliphatic unsaturation which comprises treating diphenylsilane diol with a dichlorosilane containing one silicon-bonded vinyl group and one silicon-bonded monovalent hydrocarbon radical free of aliphatic unsaturation, said diphenylsilane diol and said dichlorosilane being employed in substantially equal molar quantities, in the presence of a tertiary amine hydrogen chloride acceptor, said tertiary amine being present in amounts at least sufficient to react with the hydrogen chloride produced.

9. A process for producing 2,2,6,6-tetraphenyl-4,8-divinyl - 4,8 - dimethylcyclotetrasiloxane which comprises treating diphenylsilane diol with methylvinyldichlorosilane, said diphenylsilane diol and said methylvinyldichlorosilane being employed in substantially equal molar quantities, in the presence of a tertiary amine hydrogen chloride acceptor, said tertiary amine being present in amounts at least sufficient to react with the hydrogen chloride produced.

References Cited in the file of this patent

UNITED STATES PATENTS

| | | |
|---|---|---|
| 2,547,944 | Iler | Apr. 10, 1951 |
| 2,684,379 | Guillissen et al. | July 20, 1954 |
| 2,816,089 | Willis | Dec. 10, 1957 |
| 2,867,599 | Hurd | Jan. 6, 1959 |
| 2,899,403 | Lewis | Aug. 11, 1959 |

UNITED STATES PATENT OFFICE

CERTIFICATE OF CORRECTION

Patent No. 3,037,962                               June 5, 1962

Homer A. Hartung et al.

It is hereby certified that error appears in the above numbered patent requiring correction and that the said Letters Patent should read as corrected below.

Column 6, line 69, for "175" read -- 1.75 --.

Signed and sealed this 9th day of October 1962.

(SEAL)
Attest:

ERNEST W. SWIDER
Attesting Officer

DAVID L. LADD
Commissioner of Patents